(12) United States Patent
Niininen et al.

(10) Patent No.: US 11,151,471 B2
(45) Date of Patent: Oct. 19, 2021

(54) METHOD AND APPARATUS FOR PREDICTIVE CLASSIFICATION OF ACTIONABLE NETWORK ALERTS

(71) Applicant: HERE Global B.V., Eindhoven (NL)

(72) Inventors: Mauri Niininen, Lexington, MA (US); David Abrahams, Needham, MA (US); James Thoennes, Centreville, VA (US); Anandbabu Chakrapani, Potomac Falls, VA (US)

(73) Assignee: HERE Global B.V., Eindhoven (NL)

( * ) Notice: Subject to any disclaimer, the term of this patent is extended or adjusted under 35 U.S.C. 154(b) by 752 days.

(21) Appl. No.: 15/365,353

(22) Filed: Nov. 30, 2016

(65) Prior Publication Data

US 2018/0150758 A1    May 31, 2018

(51) Int. Cl.
   *G06N 20/00*   (2019.01)
   *G06N 5/02*    (2006.01)
   *H04L 12/24*   (2006.01)

(52) U.S. Cl.
   CPC ............. *G06N 20/00* (2019.01); *G06N 5/025* (2013.01); *H04L 41/147* (2013.01); *H04L 41/16* (2013.01); *H04L 41/22* (2013.01)

(58) Field of Classification Search
   CPC ........ G06N 20/00; G06N 20/10; G06N 20/20; H04L 41/16
   See application file for complete search history.

(56) References Cited

U.S. PATENT DOCUMENTS

| | | | |
|---|---|---|---|
| 8,903,923 B2 | 12/2014 | Pinel et al. | |
| 2005/0251406 A1* | 11/2005 | Bolt | G06Q 30/0185 726/23 |
| 2007/0222576 A1* | 9/2007 | Miller | H04L 41/0609 340/506 |
| 2012/0239596 A1* | 9/2012 | Lee | G06N 20/00 706/11 |

(Continued)

OTHER PUBLICATIONS

Last, Mark. "Online Classification of Nonstationary Data Streams." Intelligent Data Analysis, vol. 6, No. 2, pp. 129-147, 2002) (Year: 2002).*

(Continued)

*Primary Examiner* — Daniel T Pellett
(74) *Attorney, Agent, or Firm* — Ditthavong, Steiner & Mlotkowski

(57) ABSTRACT

An approach is provided for providing predictive classification of actionable network alerts. The approach includes receiving the plurality of alerts. Each alert of the plurality of alerts indicates an alarm condition occurring at a monitored network system, and is a data record comprising one or more data fields describing the alarm condition. The approach also includes classifying said each alert using a predictive machine learning model. The predictive machine learning model is trained to classify said each alert as actionable or non-actionable using the one or more data fields of said each alert as one or more respective classification features, and to calculate a respective probability that said each alert is actionable or non-actionable. The approach further includes presenting the plurality of alerts in a network monitoring user interface based on the respective probability of said each alert.

20 Claims, 12 Drawing Sheets

(56) References Cited

U.S. PATENT DOCUMENTS

| | | | |
|---|---|---|---|
| 2013/0014107 A1* | 1/2013 | Kirchhofer | G06F 9/5083 718/1 |
| 2013/0113616 A1* | 5/2013 | Pinel | G06Q 10/0631 340/501 |
| 2013/0132551 A1 | 5/2013 | Bose et al. | |
| 2014/0281734 A1 | 9/2014 | Samuni et al. | |
| 2015/0095359 A1* | 4/2015 | Duxbury | G06F 16/90344 707/758 |
| 2016/0155069 A1* | 6/2016 | Hoover | G06Q 30/06 706/12 |
| 2016/0163183 A1 | 6/2016 | Ganguly et al. | |
| 2016/0379139 A1* | 12/2016 | Eldar | G06F 16/35 706/12 |
| 2017/0270419 A1* | 9/2017 | Sanchez Charles | G06N 7/005 |
| 2018/0097740 A1* | 4/2018 | Reddy | G06Q 10/0631 |
| 2019/0171187 A1* | 6/2019 | Cella | G05B 23/0221 |

OTHER PUBLICATIONS

Tjhai, Gina C., et al. "A preliminary two-stage alarm correlation and filtering system using SOM neural network and K-means algorithm." Computers & Security 29.6 (2010): 712-723. (Year: 2010).*

Heckman, Sarah Smith. "A systematic model building process for predicting actionable static analysis alerts." (2009). (Year: 2009).*

Ranking, Improving Actionable Alert. "Finding Patterns in Static Analysis Alerts." (2014). (Year: 2014).*

Amershi, Saleema, et al. "Human-guided machine learning for fast and accurate network alarm triage." Twenty-Second International Joint Conference on Artificial Intelligence. 2011. (Year: 2011).*

Wallin, Stefan, Viktor Leijon, and Leif Landen. "Statistical analysis and prioritisation of alarms in mobile networks." International Journal of Business Intelligence and Data Mining 4.1 (2009): 4-21. (Year: 2009).*

Jung, Yungbum, et al. "Taming false alarms from a domain-unaware C analyzer by a bayesian statistical post analysis." International Static Analysis Symposium. Springer, Berlin, Heidelberg, 2005. (Year: 2005).*

Castell-Uroz, Ismael. "Towards Automatic Classification of Network Anomalies Using Machine Learning." (2011). (Year: 2011).*

Tang et al., "Identifying Missed Monitoring Alerts Based on Unstructured Incident Tickets", Proceedings of the 9th International Conference on Network and Service Management (CNSM 2013), Oct. 14-18, 2013, pp. 143-146.

Xu et al., "System Situation Ticket Identification Using SVMs Ensemble", Expert Systems With Applications vol. 60, Oct. 30, 2016, pp. 130-140.

Heckman et al., "A Model Building Process for Identifying Actionable Static Analysis Alerts", 2009 International Conference on Software Testing Verification and Validation, Apr. 1-4, 2009, 10 pages.

Ruthruff et al., "Predicting Accurate and Actionable Static Analysis Warnings: an Experimental Approach", 30th International Conference on Software Engineering, May 10-18, 2008, 10 pages.

Liang et al., "Automatic Construction of an Effective Training Set for Prioritizing Static Analysis Warnings", Proceedings of the IEEE/ACM international conference on Automated software engineering, Sep. 20, 2010, 10 pages.

Tang et al., "Optimizing System Monitoring Configurations for Non-actionable Alerts", 2012 IEEE Network Operations and Management Symposium, Apr. 16-20, 2012, 9 pages.

Moogsoft, "Machine Learning", retrieved on Nov. 30, 2016 from https://www.moogsoft.com/product/machine-learning/, pp. 1-6.

* cited by examiner

| PRED | Source | Source Instance | Entity Name | Service | Severity | Count | Cci: Application | Description | Owner | State | AW: |
|---|---|---|---|---|---|---|---|---|---|---|---|
| 0.10 | AWS | docker-10.122.40... | docker-10.122.40.195-45960-8295k7 | load-average | Warning | 3785 | HQ Live Map 2.0 | [ngmp-prd-aws-us-east-1] Load Average on docker-10.122.40... | | Open | |
| 0.10 | AWS | docker-10.122.40... | docker-10.122.40.143-36212443174 | disk-usage | Warning | 159 | Service Delivery Platfor... | [ngmp-prd-aws-us-east-1] Disk Usage on docker-10.122.40.14 | | Open | |
| 0.05 | AWS | docker-10.122.40... | docker-10.122.40.195-45960-8295k7 | cpu-utilization | Clear | 19639 | HQ Live Map 2.0 | [ngmp-prd-aws-us-east-1] CPU Utilization on docker-10.122.4... | Avalance, Abhisesh | Assigned | |
| 0.12 | AWS | docker-10.122.40... | docker-10.122.40.217-2c00d5b3c57 | load-average | Warning | 1459 | HQ Live Map 2.0 | [ngmp-prd-aws-us-east-1] Load Average on docker-10.122.40... | | Open | |
| 0.05 | NAGIOS | nagweb101-pr-sm... | nagweb101-pr.sm.ch.stor.in.here.com | app-central_c-IOS-Temp-Ambient | Clear | 8 | -- | TAGP below limits: 44Service app-central_c-IOS-Temp-Ambient | | Open | |
| 0.11 | AWS | docker-10.122.42... | docker-10.122.42.197-06389696debaa | disk-usage | Warning | 106 | Service Delivery Platfor... | [ngmp-prd-aws-us-east-1] Disk Usage on docker-10.122.42.19... | | Open | |
| 0.05 | AWS | docker-10.122.40... | docker-10.122.40.217-2c00d5b3c57 | cpu-utilization | Clear | 8539 | HQ Live Map 2.0 | [ngmp-prd-aws-us-east-1] CPU Utilization on docker-10.122.4... | | Open | 894 |
| 0.99 | AWS | AutoScalingGroupName: Consaul-sdp-prd-aw... | Consaul3-sdp-prd-aws-us-east-1... | comsul3-sdp-prd-aws-data | Critical | 23 | PAT1 Deployment Mgmt | Threshold Crossed: 1 datapoint (96.3071656077371) was g... | | Open | 171 |
| 0.99 | AWS | instanceld: I-28d9fef8 | instanceld: I-28d9fef8 | kafkafet8_nagios_app-mfax-data | Critical | 1 | MFS2 (33AC) | Threshold Crossed: 2 datapoints were greater than the thr... | | Open | |
| 0.05 | AWS | docker-10.122.42... | docker-10.122.42.39-75e2c5491215t | load-average | Clear | 992 | Service Delivery Platfor... | [ngmp-prd-aws-us-east-1] Load Average on docker-10.122.42... | | Open | 174 |
| 0.97 | AWS | instanceld: I-f8b0de51 | instanceld: I-f8b0de51 | I-f8b0de51_nagios_app-mfax-data | Critical | 1 | MFS1 (30AC) | Threshold Crossed: 2 datapoints were greater than the thr... | | Open | |
| 0.90 | CATCHP... | 54.79.146.6632 | Datastore Alpha-PRD-Age-PRD-Age-Pri(1-42464) | Test Failure | Critical | 38 | Datastore Alpha | Datastore Alpha.PRD-Age-Pri Test Failure-Here Atlanta 8... | Rai, Guraharan | Ackno... | |
| 0.05 | AWS | docker-10.124.48... | docker-10.124.48.1-b3e0b7fe6895 | cpu-utilization | Clear | 112 | Service Delivery Platfor... | [sdp-prd-aws-us-east-1] CPU Utilization on docker-10.124.48.1 | | Open | |
| 0.05 | NAGIOS | nagweb101-pr-sm... | nagweb101-pr.sm.ch.stor.in.here.com | app-central_c-IOS-Temp-Ambient | Clear | 11 | -- | TAGP below limits: 47Service app-central_c-IOS-Temp-Ambient | | Open | |
| 0.07 | NAGIOS | nagweb101-pr-sm... | nagweb101-pr.sm.ch.stor.in.here.com | app-central_c-IOS-Temp-Ambient | Clear | 6 | -- | TAGP below limits: 49Service app-central_c-IOS-Temp-Ambient | | Open | |
| 0.97 | AWS | Hostname: prod-sofr-us-west-2-48630490... | SQLR-PRDD-J-S-28-EC2-prod... | SQLR-PRDD-J-S-28-EC2-prod... | Critical | 29 | Social Common Backe... | Threshold Crossed: 8 datapoints were greater than or equ... | Acknowledged | Assign... | 300 |
| 0.05 | AWS | docker-10.124.48... | docker-10.124.48.10-b4c4dc3fc6fac | cpu-utilization | Clear | 52 | Service Delivery Platfor... | [sdp-prd-aws-us-east-1] CPU Utilization on docker-10.124.48... | | Open | |
| 0.23 | NAGIOS | splunk101-pr-sm... | splunk02.pek.nspc.s.nokia.com | sys-disk_avg_queue_sze | Warning | 427 | HLP Core Platform China | SAR WARNING: sar -d -p, splunk02-iv_home avgqu-sz = 2.34... | Bhat, Shreeramana | Ackno... | |
| 0.95 | NAGIOS | splunk101-pr-sm... | splunk01.pek.mspc.s.nokia.com | sys-disk_avg_queue_size | Critical | 253 | HLP Core Platform Chi... | SAR CRITICAL: sar -d -p, splunk01-iv_home avgqu-sz = 1... | Bhat, Shreeramana | Ackno... | |

92 entities 100 ale... 30791

Showing 1 to 100 of 338

METHOD AND APPARATUS FOR PREDICTIVE CLASSIFICATION OF ACTIONABLE NETWORK ALERTS

BACKGROUND

Service providers (e.g., information technology (IT) service providers) often are responsible for monitoring IT systems, services, and/or related networks for alerts indicating possible alarm conditions or other network events that require action by operational personnel (e.g., actionable alerts). As part of this responsibility, IT service providers may need to make quick decisions on whether the alerts are actionable or non-actionable. For example, an alert is actionable if the alert requires action by IT service provider personnel to resolve; otherwise the alert is non-actionable. However, when too many alerts are received at the same time, it can be difficult for IT personnel to quickly decide which alerts are actionable or non-actionable, thereby resulting in delays in detecting and resolving service and/or customer impacting incidents. Accordingly, service providers face significant technical challenges to quickly and accurately classifying alerts as actionable or non-actionable.

SOME EXAMPLE EMBODIMENTS

Therefore, there is a need for an approach for predictive classification of actionable alerts.

According to one embodiment, a method of presenting a plurality of alerts based on a predictive classification comprises receiving the plurality of alerts. Each alert of the plurality of alerts indicates an alarm condition occurring at a monitored network system, and said each alert is a data record comprising one or more data fields describing the alarm condition. The method also comprises classifying said each alert using a predictive machine learning model. The predictive machine learning model is trained to classify said each alert as actionable or non-actionable using the one or more data fields of said each alert as one or more respective classification features, and to calculate a respective probability that said each alert is actionable or non-actionable. The method further comprises initiating a presentation of the plurality of alerts in a network monitoring user interface based on the respective probability of said each alert.

According to another embodiment, an apparatus to present a plurality of alerts based on a predictive classification comprises at least one processor, and at least one memory including computer program code for one or more computer programs, the at least one memory and the computer program code configured to, with the at least one processor, cause, at least in part, the apparatus to receive the plurality of alerts. Each alert of the plurality of alerts indicates an alarm condition occurring at a monitored network system, and is a data record comprising one or more data fields describing the alarm condition. The apparatus is also caused to initiate a presentation of the plurality of alerts in a network monitoring user interface based on the respective probability of said each alert.

According to another embodiment, a non-transitory computer-readable storage medium to present a plurality of alerts based on a predictive classification carries one or more sequences of one or more instructions which, when executed by one or more processors, cause, at least in part, an apparatus to receive the plurality of alerts. Each alert of the plurality of alerts indicates an alarm condition occurring at a monitored network system, and is a data record comprising one or more data fields describing the alarm condition. The apparatus is also caused to initiate a presentation of the plurality of alerts in a network monitoring user interface based on the respective probability of said each alert.

According to another embodiment, an apparatus to present a plurality of alerts based on a predictive classification comprises means for receiving the plurality of alerts. Each alert of the plurality of alerts indicates an alarm condition occurring at a monitored network system, and is a data record comprising one or more data fields describing the alarm condition. The apparatus also comprises means for classifying said each alert using a predictive machine learning model. The predictive machine learning model is trained to classify said each alert as actionable or non-actionable using the one or more data fields of said each alert as one or more respective classification features, and to calculate a respective probability that said each alert is actionable or non-actionable. The apparatus further comprises means for initiating a presentation of the plurality of alerts in a network monitoring user interface based on the respective probability of said each alert.

According to another embodiment, a method of presenting a plurality of alerts based on a predictive classification comprises receiving a plurality of alerts. Each alert in the plurality of alerts indicates an alarm condition occurring in a monitored network system, and is labeled as either an actionable alert or a non-actionable alert. The method also comprises training a predictive machine language model to classify a subsequent alert as actionable or non-actionable using the one or more data fields of said each alert as one or more respective classification features. The predictive machine language model is configured to calculate a probability that the subsequent alert is actionable or non-actionable. The subsequent alert is presented in a network monitoring user interface based on the probability.

According to another embodiment, an apparatus to present a plurality of alerts based on a predictive classification comprises at least one processor, and at least one memory including computer program code for one or more computer programs, the at least one memory and the computer program code configured to, with the at least one processor, cause, at least in part, the apparatus to receive a plurality of alerts. Each alert in the plurality of alerts indicates an alarm condition occurring in a monitored network system, and is labeled as either an actionable alert or a non-actionable alert. The apparatus is further caused to train a predictive machine language model to classify a subsequent alert as actionable or non-actionable using the one or more data fields of said each alert as one or more respective classification features. The predictive machine language model is configured to calculate a probability that the subsequent alert is actionable or non-actionable. The subsequent alert is presented in a network monitoring user interface based on the probability.

According to another embodiment, a non-transitory computer-readable storage medium to present a plurality of alerts based on a predictive classification carries one or more sequences of one or more instructions which, when executed by one or more processors, cause, at least in part, an apparatus to receive a plurality of alerts. Each alert in the plurality of alerts indicates an alarm condition occurring in a monitored network system, and is labeled as either an actionable alert or a non-actionable alert. The apparatus is further caused to train a predictive machine language model to classify a subsequent alert as actionable or non-actionable using the one or more data fields of said each alert as one or more respective classification features. The predictive machine language model is configured to calculate a probability that the subsequent alert is actionable or non-actionable. The subsequent alert is presented in a network monitoring user interface based on the probability.

According to another embodiment, an apparatus to present a plurality of alerts based on a predictive classification comprises means for receiving a plurality of alerts. Each alert in the plurality of alerts indicates an alarm condition occurring in a monitored network system, and is labeled as either an actionable alert or a non-actionable alert. The apparatus also comprises means for training a predictive machine language model to classify a subsequent alert as actionable or non-actionable using the one or more data fields of said each alert as one or more respective classification features. The predictive machine language model is configured to calculate a probability that the subsequent alert is actionable or non-actionable. The subsequent alert is presented in a network monitoring user interface based on the probability.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a diagram illustrating an example user interface for presenting alerts based on predictive classification, according to one embodiment;

DESCRIPTION OF SOME EMBODIMENTS

Examples of a method, apparatus, and computer program for predictive classification of actionable alerts, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
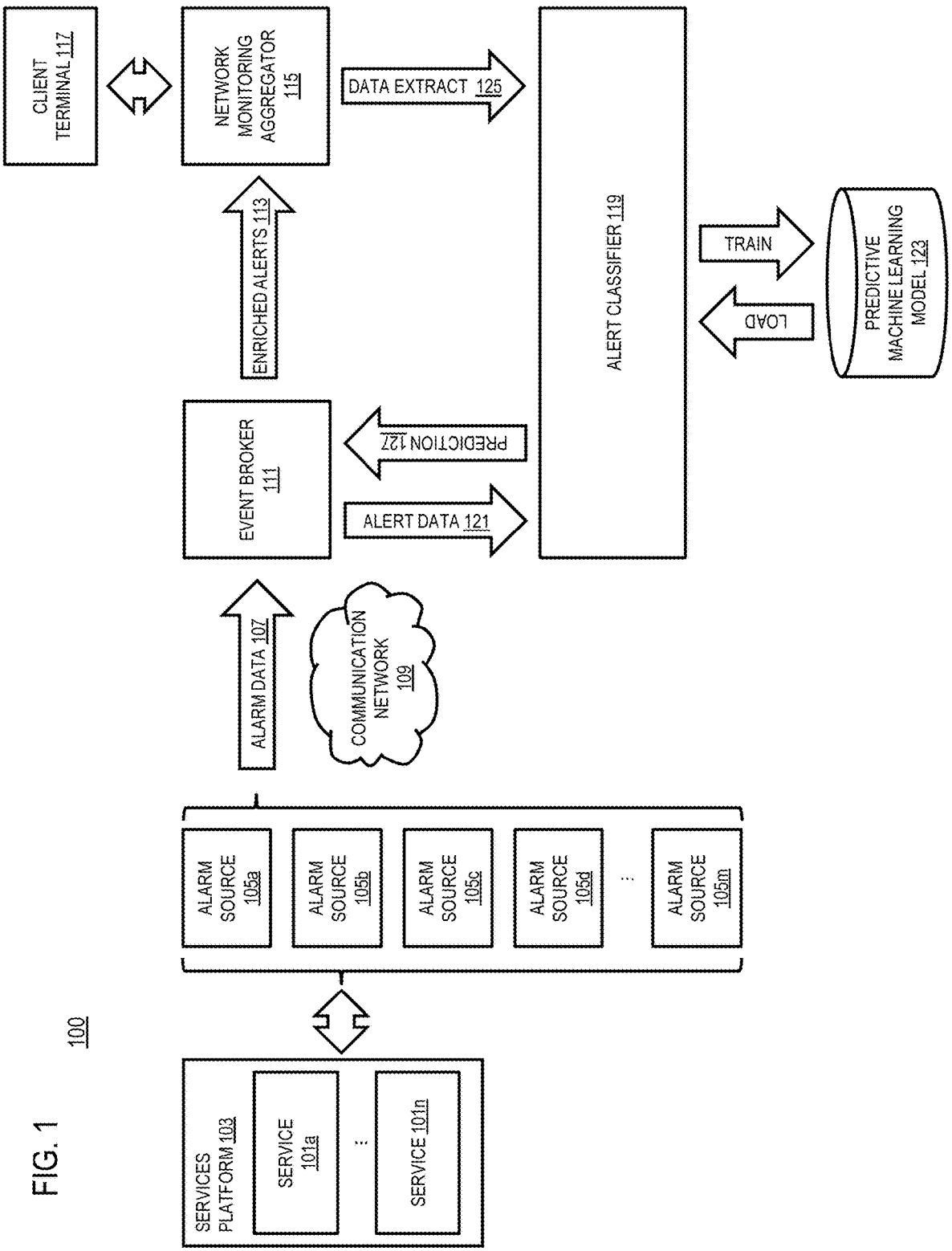
FIG. 1 is a diagram of a system capable of providing predictive classification of actionable network alerts, according to one embodiment.

FIG. 1 is a diagram of a system capable of providing predictive classification of actionable network alerts, according to one embodiment. Service providers (e.g., Information Technology (IT) service providers) often enter into Service Level Agreements (SLAs) with customers that commit to certain performance requirements with respect to providing IT services, applications, networks, etc. Such SLAs generally require a minimum service uptime, maximum response times (e.g., time from alarm or fault detection to initiating a response action, typically 15 minutes or less), maximum resolution times (e.g., time from alarm or fault detection to resolving the alarm or fault, typically 120 minutes or less), etc. For a typical IT service provider with a large portfolio of services with SLAs (e.g., services 101a-101n of the services platform 103—also collectively referred to as services 101,), constant monitoring (e.g., 24 hours by 7 days a week) of the services 101 is important. By way of example, there are many tools and systems (e.g., alarm sources 105a-105m—also collectively alarm sources 105) available for this type of monitoring, and typically IT service providers configure alerts in these tools based on SLA requirements. By way of example, these tools or alarm sources 105 include, but are not limited to, Nagios, Amazon Web Services (AWS) Cloudwatch, Catchpoint, SCILO, Zabbix, and the like.

Historically, the alarm data 107 are sent over a communication network 109 to operations personnel (e.g., a Network Operations Center (NOC) personnel) to investigate whether the alert is actionable or non-actionable. In one embodiment, an actionable alert refers to any alert that is to be resolved through actions by the operations personnel. A non-actionable alert refers to all other alerts not classified as actionable, including alerts arising from network or system events that are self-healing or that can be automatically resolved without intervention from the operations personnel (e.g., automatic scaling of available servers in response to increase service demands or traffic). Generally, for actionable alerts an incident ticket or report is created, and the operations personnel follow an incident resolution process to resolve the issue impacting a monitored service.

In a typical use case, a NOC can receive over 30,000 alarms per month when monitoring a suite of services 101, with many of the services 101 have very tight SLAs that require, for instance, 15 minute response times and 120 minute resolution times for actionable alerts. Accordingly, NOC personnel face significant technical challenges to quickly decide whether each of the 30,000 alarms is actionable to meet applicable SLA requirements. For example, 98% of the alerts received at a NOC has historically been non-actionable, with only the remaining 2% actionable. Therefore, actionable alerts can be quickly buried by the high volume of co-occurring non-actionable alerts.

In one embodiment, for actionable alerts, NOC personnel create an incident ticket and contact on-call engineers (e.g., T3 engineers) to start resolving the issue. Historically, NOC personnel use simple filtering and manual correlation using, for instance, runbooks or other standard operating procedure manuals to distinguish actionable alerts from non-actionable alerts. Often, NOC personnel wait to check if the alert/alarm will repeat multiple times or whether the self-healing or other automated processes fix the underlying problem automatically before deciding if an alert is actionable. Then, if NOC personnel deem the alert/alarm to be actionable or otherwise critical, the NOC will create an incident ticket (e.g., via a ticketing system) to indicate that the alert/alarm is actionable. In one embodiment, the event broker 111 can enrich or append the alert (e.g., the data record representing the alert) with related metadata or contextual information about the alarm condition causing the alert, the impacted service 101 or application, and the like. This enriched alarm data 113 can then be transmitted to a network monitoring aggregator 115 (e.g., RiverMuse, RightITnow, etc.) ethat acts as a central console for aggregating received alerts from multiple alarm sources 105 and/or services 101 for presentation, tracking, management, resolution, etc. In one embodiment, NOC personnel can access, view, manage, etc. received alerts of the network monitoring aggregator 115 through a client terminal 117.

The simple filtering and manual correlation process described above can severely tax the capacity of NOC personnel, particularly when a high volume of alerts are received at the same time. This in turn can cause significant enough delays to potentially impact the ability of the NOC to meet tight SLA requirements (e.g., response times, resolution times, service uptime, etc.).

To address this problem, the system 100 introduces a capability to use a machine learning system (e.g., an alert classifier 119) to automatically predict whether an alert (e.g., indicated by alert data 121 transmitted from the event broker 111) is actionable or non-actionable using a trained predictive machine learning model 123. In one embodiment, the alert classifier 119 learns from human actions, captures the alert data 121 from actual alerts that cause incidents (e.g., giving rise to alarm conditions in monitored services 101). In one embodiment, the alert classifier 119 can use optimization strategies to maximize the accuracy of the of the predictive machine learning model 123 (e.g., by monitoring true positive rates and false positive rates to adjust model training parameters, hyperparameters, etc.). In one embodiment, the system 100 then uses the alert classifier 119 and the predictive machine learning model 123 for realtime or substantially realtime predictions or classifications that allow operations personnel to quickly determine whether the alert should be actionable or non-actionable. In one embodiment, the alert classifier 119 incorporates a feedback loop between the predictive machine learning model 123 and manual classifications by operations personnel to constantly learn and improve the accuracy of the predictive machine learning model 123.

In other words, the system 100 continuously learns, via machine learning, to identify incident causing alarms (e.g., actionable alerts) and highlights them in a network monitoring user interface for review by operations personnel, thereby advantageously reducing the work, time, resources, etc. associated with classifying alerts. In one embodiment, the system 100 uses manually labeled alert data as ground truth data for training the predictive machine learning model 123 (e.g., alert data that has been for which an incident ticket has been manually created is indicative of a manually labeled actionable alert). The alert classifier 119 will then classify the alert data 121 and/or alarm data 107 as actionable or non-actionable, and push the prediction score for each alert (e.g., a calculated probability that a given alert is actionable or non-actionable) into the network monitoring aggregator 115 for presentation to NOC personnel via the client terminal 117. In this way, the system 100 can improve the NOC personnel's ability to react faster to alerts coming from monitored production services 101 and create incident tickets for actionable alerts (e.g., to meet tight SLA requirements).

As shown in FIG. 1, in one embodiment, the event broker 111 aggregates alarm data 107 from a variety of alarm sources 105 and/or services 101 to initiate training of the predictive machine learning model 123. The alarm data 107 is then enriched (e.g., with metadata and contextual parameters about the corresponding alert, monitored service 101, alarm source, etc.) for storage in the network monitoring aggregator 115. In one embodiment, alert classifier 119 then queries to extract stored alerts (e.g., data extract 125) from the network monitoring aggregator 115 (e.g., using an application programming interface (API) of the network monitoring aggregator 115).

In one embodiment, the alert classifier 119 determines the optimal training timeframe by splitting the data extract 125 into different length train-test splits. By way of example, a train split refers to the portion of the data extract that is to be used to train the predictive machine learning model 123, and the test split refers to the portion of the data extract 125 that is to test or validate the predictive machine learning model 123 after being trained using the training split. In one embodiment, the train-test split is based on time, and the split point represents point in time that delineates historical alert data (e.g., labeled data) from future alert data (e.g., unlabeled data). For example, for a data extract 125 spanning 10 days of alert data, the historical alert data from a previous 7 days can be used as the train split and the next 3 days can be used as the test split. It is noted that the above split example is provided by way of illustration and not limitation. It is contemplated that the system 100 can use any criteria or rule to split the data (e.g., by alert count, by service 101, by alarm source 105, etc.), and the split can occur at any ratio.

In one embodiment, for each training split, a grid of the predictive machine learning model 123 is trained and then evaluated with different hyperparameter sets (e.g., when creating a model using a logistic regression, one example hyperparameter is regularization strength). The optimal training length and hyperparameters (e.g., training length and/or hyperparameter beyond which prediction or classification accuracy is not improved beyond a threshold criteria) are then saved by the alert classifier 119. In one embodiment, the alert classifier 119 frequently retrains the predictive machine learning model 123 using the stored hyperparameters by getting historical alerts from the network monitoring aggregator 115 for the last n days, wherein n is the value determined during hyperparameter optimization. Once the predictive machine learning model 123 is trained, it is pickled (e.g., a serialization of the model 123 using Python) and stored for use by the alert classifier 119.

In one embodiment, as new or subsequent alerts are received by the event broker 111, the event broker 111 interacts with the alert classifier 119 to load the pickled (or serialized) predictive machine learning model 123 to process the newly received alert in real-time or substantially real-time. By way of example, real-time or substantially real-time refers to processing an alert within a predetermined threshold time (e.g., typically within a milliseconds, seconds, minutes, or any other time period specified by a system administrator) from first receiving the alert data. The alert classifier 119 then feeds the data fields of the alert record into the model, and obtains a classification or prediction 127 (e.g., calculated probability) of whether the alert is actionable or non-actionable. In one embodiment, the classification and/or prediction 127 is added as field of the alert record, and the enriched alert record is stored in the network monitoring aggregator 115 for presentation to operations personnel or other use (e.g., deciding on whether to take an automated action to resolve the incident impacting the monitored service 101. In yet another embodiment, the predicted probability that an alert is actionable, the system 100 can automatically create an incident ticket without NOC personnel intervention, and assign the incident to operations personnel responsible for resolving the alert (e.g., a T3 support team).

By way of example, the communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

Figure 2:
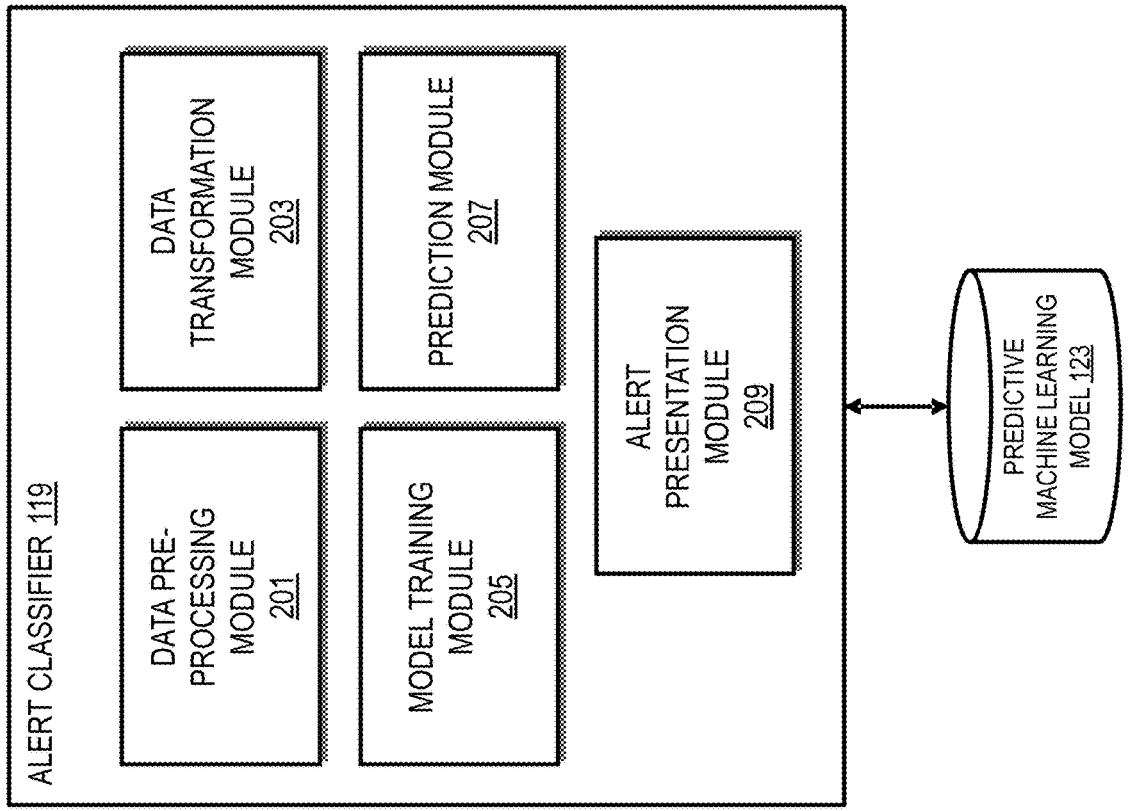
FIG. 2 is a diagram of components of an alert classifier, according to one embodiment.

In one embodiment, the event broker 111, the network monitoring aggregator 115, and/or the alert classifier 119 may include multiple interconnected components. For example, these components may include multiple servers, intelligent networking devices, computing devices, algorithms, components and corresponding software for providing predictive classification of actionable alerts as described with respect to the various embodiments. Although depicted as separate components, it is contemplated one or more functions of the event broker 111, the network monitoring aggregator 115, and/or the alert classifier 119 may be combined into a single component or any component of the system 100. Example components of the alert classifier is illustrated in FIG. 2 and further discussed below.

The services platform 103 may include any type of service 101 for which alert monitoring can be performed. By way of example, the services platform 103 may include mapping services, navigation services, social networking services, content (e.g., audio, video, images, etc.) provisioning services, application services, storage services, contextual information determination services, location based services, information (e.g., weather, news, etc.) based services, etc. In one embodiment, the services platform 103 may interact monitoring tools and systems (e.g., the alarm sources 105) to monitor alarm conditions and/or other events/incidents that might impact the delivery of the services 101 to end users. By way of example, these monitoring tools may include both external third-party tools and/or tools built into the services 101 themselves. As noted above, examples of these tools include, but are not limited to, Nagios, Amazon Web Services (AWS) Cloudwatch, Catchpoint, SCILO, Zabbix, and the like.

By way of example, the client terminal 117 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client terminal 117 can support any type of interface to the user (such as "wearable" circuitry, etc.).

By way of example, the event broker 111, network monitoring aggregator 115, and the alert classifier 119 may communicate over the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
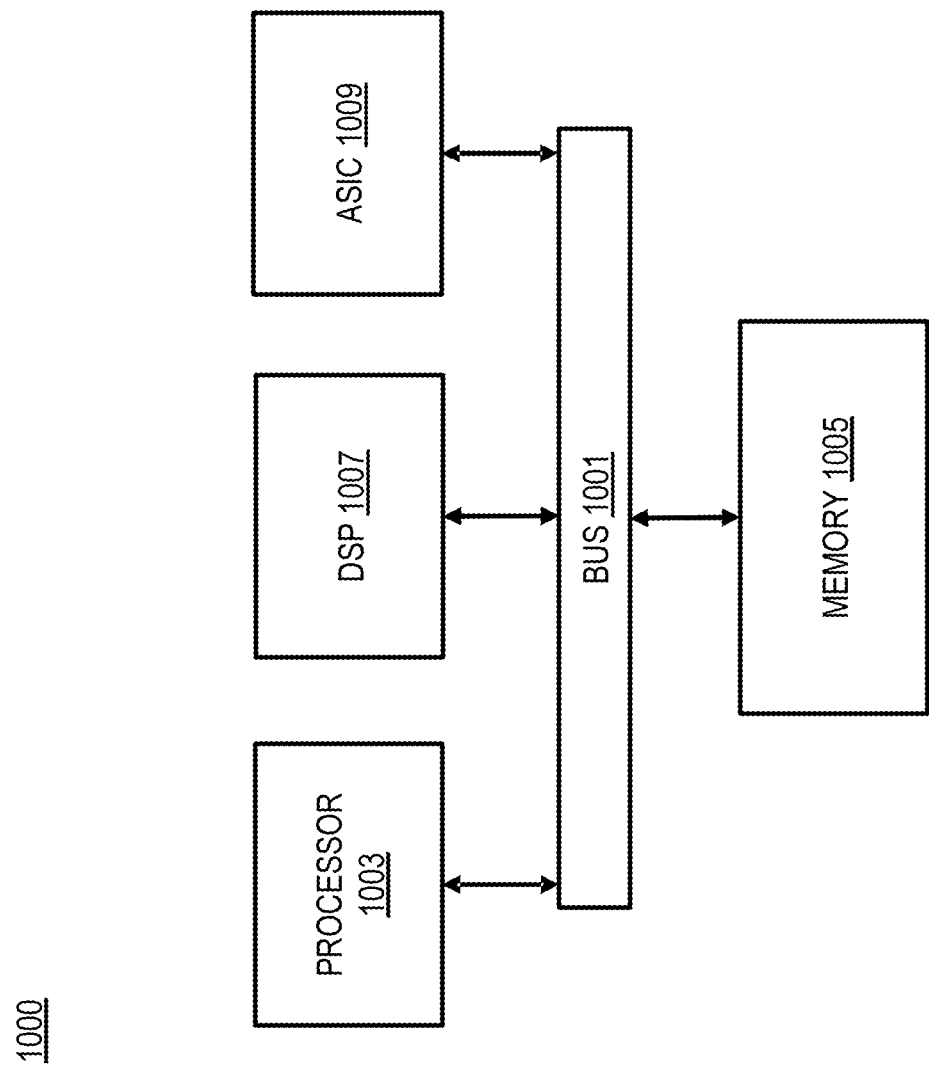
FIG. 10 is a diagram of a chip set that can be used to implement an embodiment of the invention.

FIG. 2 is a diagram of components of an alert classifier, according to one embodiment. By way of example, the alert classifier 119 may include one or more components for providing predictive classification of actionable alerts, and may be implemented in, for instance, a chip set including a processor and a memory as shown in FIG. 10. In one embodiment, the alert classifier 119 includes a data pre-processing module 201, a data transformation module 203, a model training module 205, a prediction module 207, and an alert presentation module 209. It is contemplated that the functions of these components may be combined in one or more components or performed by other components with similar functionalities (e.g., the event broker 111, network monitoring aggregator 115, client terminal 117, etc.). The functions of these components are described with respect to FIGS. 3, 4, and 5A-5C.

Figure 3:
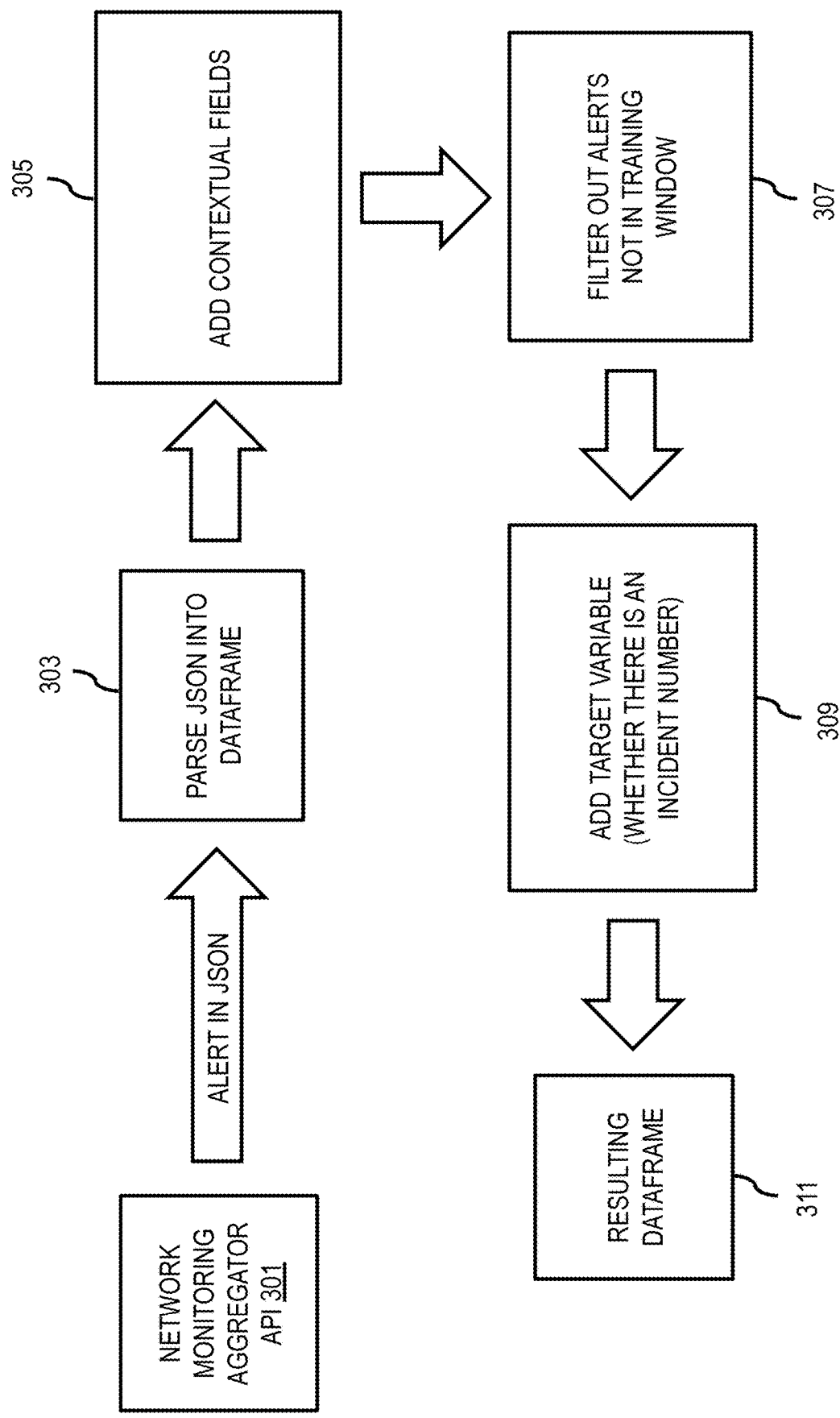
FIG. 3 is a diagram of an example process for preprocessing formatted training data for the alert classifier, according to one embodiment.

In one embodiment, the data pre-processing module 201 processes alert data that comes back from the network monitoring aggregator 115 (e.g., data extract 125) to, for instance, format and further enrich the data before training the predictive machine learning model 123. FIG. 3 is a diagram of an example process for pre-processing formatted training data for the alert classifier, according to one embodiment. In the example of FIG. 3, the network monitoring aggregator 115 outputs the data extract 125 in, for instance, a JavaScript Objection Notation (JSON) format. However, it is contemplated that the various embodiments are applicable to any data-interchange format and is not limited to JSON. As shown, a network monitoring aggregator application programming interface (API) 301 outputs the alert data (e.g., data extract 125) in JSON or any other similar format. The data pre-processing module 201 parses the JSON into a format suitable for training the predictive machine learning model 123 (at process 303). In this example, the JSON formatted-data is parsed into a Pandas Dataframe (e.g., a two-dimensional size-mutable, potentially heterogeneous tabular data structure with labeled axes), but it is contemplated that any similar data structure or format can be used with the various embodiments described herein.

In one embodiment, at process 305, the data pre-processing module 201 can add additional fields to supplement the dataframe with contextual data or other related data for each alert. Examples of data fields that can be added include, but are not limited to: (1) information on the originating alarm source 105; (2) time stamp information; (3) time of day information; and (4) indications of wither a predetermined threshold has been crossed.

In one embodiment, with respect to the alarm source information, alert data extracted from the networking monitoring aggregator 115 may provide a different types of labels to indicate a source instance depending on what monitoring tool or system is being used to monitor a particular service. To provide consistency, the data pre-processing module 201 can standardize the labels from the different tools for additional processing. To illustrate, example source instances can be labeled as "nagweb101-pr-ams05.tool.in.example-service.com" or "docket-10.122.190.140-17847e7e3fd". In this case, the data pre-processing module 201 can parse the first word (e.g., a descriptive word indicating the alarm source 105) from each label to result respectively in "nagweb101" and "docker". This source instance splice can then be added as a new field in the dataframe or record of each alert.

In one embodiment, with respect to time stamp information, the data pre-processing module 201 can parse the data extract for each alert to determine a "last occurred" or similar field, and then convert the field in nanoseconds or other common format. This converted time stamp information can then be added as a new filed in the dataframe or record of the each alert. In one embodiment, the data pre-processing module 201 can further convert the time stamp (e.g., in nanoseconds) into a Coordinated Time Code (UTC) time of day (e.g., a decimal value from 0-23.99). The UTC time of day can also be added as a new field in the dataframe or record of each alert.

In one embodiment, alarm source monitoring tools and systems can determine whether any configured threshold values have been crossed as part of its monitoring and reporting activities. For example, an administrator may set thresholds on a number of times an alarm is repeated, a duration of the alarm, etc. If any of the configured thresholds are crossed, the alarm source 105 generally adds "threshold crossed" or other similar phrase in the description field of the corresponding alert. In one embodiment, the data pre-processing module 201 can parse the description for occurrences of "threshold crossed" or similar phrase in the description field of the extracted alert data. A Boolean or similar field can then be added to the dataframe or record of each alert to indicate whether or not "threshold crossed" or similar phrase was detected to occur in the respective description field.

In one embodiment, at process 307, the data processing module 201 can filter out the extracted alerts that are not in a configured training window. In one embodiment, the system 100 can select a training window (e.g., a number of days of alerts over which a training data set is to be collected). For example, if a training windows is configured as the previous 7-days, the data processing module can filter those extracted alerts that do not fall within that pervious 7-day period (e.g., as indicated by the respective time stamps of each alert).

In one embodiment, at process 309, the data pre-processing module 201 can determine whether the each extracted alert has been manually or otherwise previously labeled as actionable or non-actionable. By way of example, the alert data extracted from the network monitoring aggregator 115 generally will not have a data field specifically indicating whether an alert is actionable or non-actionable. Instead, if an alert has been determined by operations personnel to be actionable, an incident ticket will be created and an incident number will be assigned to the alert. Accordingly, the data pre-processing module 201 can parse the extracted alert data to determine whether an incident number has been assigned to the alert. If there is an incident number for an alert, the alert is considered to have been labeled as actionable by the operations personnel. If not present, the alert is considered to have been labeled as non-actionable. In this way, the data pre-processing module 201 can add a data field to the dataframe or record for each alert to indicate whether each alert is actionable or non-actionable based on the presence of the incident number.

At process 311, the data pre-processing module 201 generates a resulting dataframe that, for instance, includes the extracted alerts that have been enriched (e.g., with additional data fields), filtered, and/or sorted for training of the predictive machine learning module 123.

In one embodiment, after pre-processing of the extracted alert data by the pre-processing module 201, the data transformation module 203 of FIG. 2 can process the alert data using one or more data transformers based on the variable type of the data fields of the alert data. By way of example, the data transformation process is discussed with respect to FIG. 4 which is a diagram of a process for training a predictive classification model of the alert of classifier in an example development environment, according to one embodiment. The example of FIG. 4 is illustrated in a Python-based development environment, although it is noted that any development environment providing equivalent or similar features may be used according to the various embodiments described herein.

Figure 4:
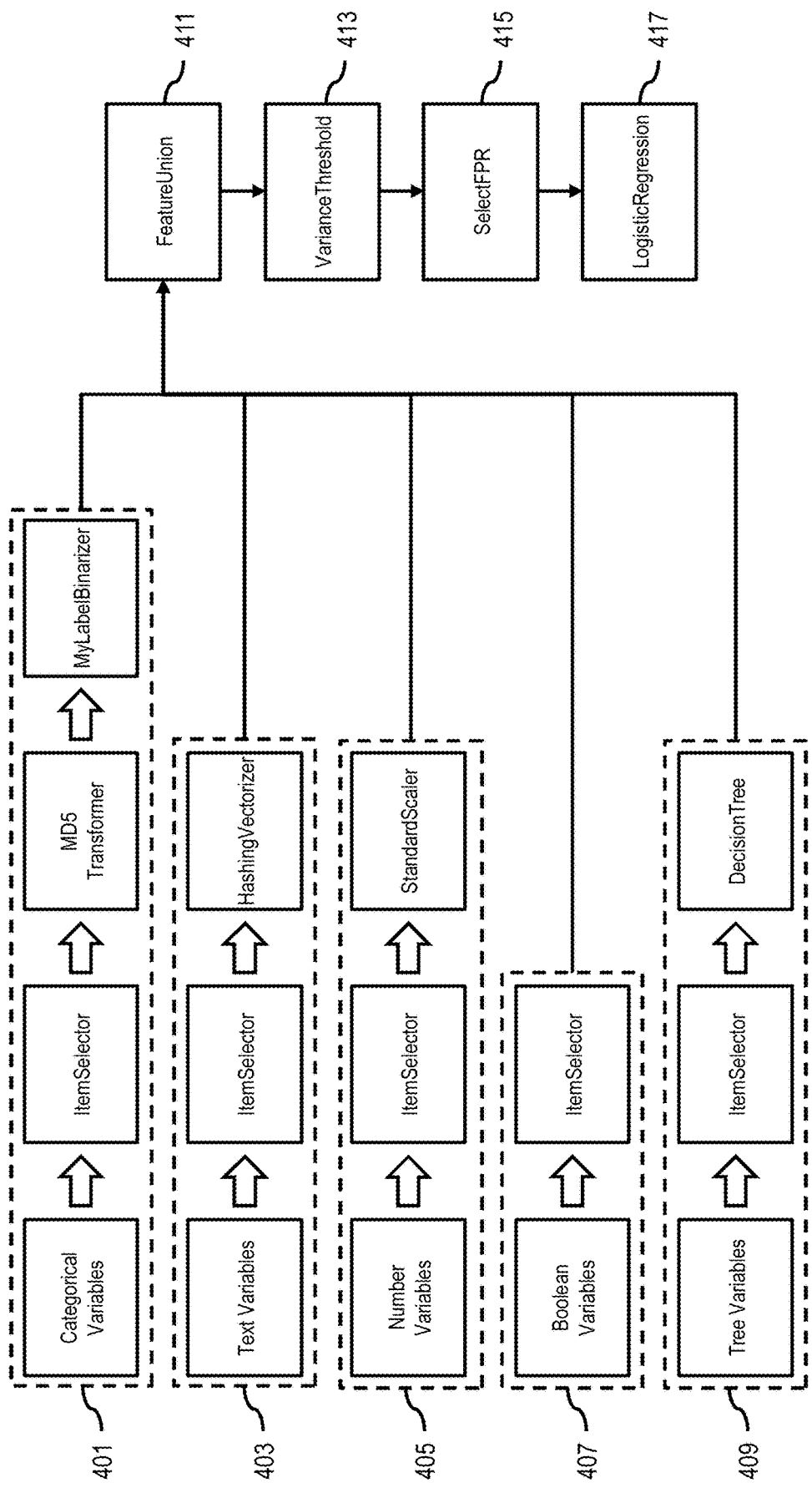
FIG. 4 is a diagram of a process for training a predictive classification model of the alert of classifier in an example development environment, according to one embodiment.

Within a Python environment, the predictive machine learning model 123 is a sklearn.Pipeline (e.g., a pipeline available in a Python machine learning library that includes multiple data transformers 401-409 with a final estimator, e.g., processes 411-417 as shown in FIG. 4) that handles feature engineering and processing related to training and using the model 123 to provide predictive classification of actionable alerts. In one embodiment, the data transformation module 203 includes a transformers for each variable type included in the data fields of an alert record to transform the data field values into a numeric matrix for training of the predictive machine learning model 123. Examples of these variable include, but are not limited to:

(1) CATEGORICAL VARIABLES—variables with values defined as discrete categorical labels. Example data fields include, but are not limited to: Source, Severity, Source Instance Splice, Entity Name Splice, Source Instance, Application, Operations Desk, Entity Name, Service, and Description.

(2) TEXT VARIABLES—variables with text-based content or values. Example data fields include, but are not limited to: Description, Entity Name, and Service.
(3) NUMERICAL VARIABLES—variables with numeric-based content or values. An example data field includes, but is not limited to: Count.
(4) BOOLEAN VARIABLES—which are variables that are either true or false. Example data fields include, but are not limited to: Threshold Crossed and Downtime.
(5) TREE VARIABLES—which are variables with non-linear relationships with respect to an alert incident, and where the non-linear relationships can be represented as decision trees. An example data field includes, but is not limited to: TimeOfDay.

In one embodiment, one data field can be treated or as classified as multiple variable types. For example, Description, Entity Name, and Service, can be treated as both text and categorical fields in order to detect relationships not only between identified fields, but also partial similarities (e.g., Descriptions that are similar, but not exactly the same).

In one embodiment, the data transformation module 203 performs or includes transformers for each of the different variable types, e.g., categorical transformer 401, text transformer 403, number transformer 405, Boolean transformer 407, and tree transformer 409. In one embodiment, each of the transformers 401-409 include component transformers grouped in different combinations to create the respective transformer pipeline.

For example, each transformer 401-409 includes at an initial ItemSelector transformer. In one embodiment, the ItemSelector Transformer is a custom transformer defined in Python that enables the use of a dataframe as an input to the predictive machine learning model 123 pipeline. Traditional Python pipelines act multi-dimensional arrays (e.g., NumPy arrays) including elements of the same type indexed by a tuple of positive integers. In one embodiment, the ItemSelector is initialized with a column name (or names), and its transform function returns a corresponding column from a dataframe (e.g., a column corresponding to an alert record of interest). As noted, this transformer precedes every other transform that is performed by the data transformation module 203, and allows the module 203 to apply different transforms to different columns (e.g., alert records) of the dataframe.

In one embodiment, the categorical transformer 401 is a custom pipeline that selects a column (e.g., using the ItemSelector transformer), feeds it through an MD5Transformer, and a MyLabelBinarizer transformer, to convert categorical variables into a numeric matrix. For example, a categorical field with four possibilities (e.g., four categorical labels) is transformed into a four-column matrix. In one embodiment, the MD5Transformer is a custom transformer that hashes inputs according to the md5 algorithm to shorten long strings and makes the resulting predictive machine learning model 123 smaller when stored or pickled. In some embodiments, this hashing transform is an optional step (e.g., which storage size is not a limitation or consideration). It is also contemplated that any other hashing algorithm can be used in place of the md5 algorithm described above.

In one embodiment, the MyLabelBinarizer transformer is equivalent to sklearn's LabelBinarizer with the exception that MyLabelBinarizer outputs two columns in standard one-encoding fashion instead of one column of the standard LabelBinarizer. More specifically, LabelBinarizer binarizes categorical labels in a one versus all fashion to generate a resulting vector. In one embodiment, each categorical label is converted to an individual binary label (e.g., belong or does not belong to the class indicated by the label). However, when using the traditional LabelBinarizer to fit on a vector with only two possible values, the sklearn LabelBinarizer only outputs one column (e.g., assigning one of the two possibilities the value 1, and the other 0). In contrast, MyLabelBinarizer outputs two columns in standard one-hot encoding fashion. In one embodiment, the two-column output advantageously avoids potential dimension mismatch errors when training the model 123 on a vector with two unique values, but testing on a vector with three or more unique values.

In one embodiment, the text transformer 403 is a custom pipeline that selects a column (e.g., using the ItemSelector transformer) and feeds it through a HashingVectorizer transformer to transform text data into a numeric matrix. In one embodiment, the HashingVectorizer transforms a column of text into a token matrix (e.g., each element of the token matrix corresponding to a word or token), wherein each column is the occurrence of a single word or token. The HashingVectorizer uses hashing to find that mapping between a token or word and the feature integer index, thereby avoid a need to store a dictionary. Alternatively, (e.g., when computer memory overhead is not a limitation or consideration), the text transformer can use a CountVectorizer which coverts text into a matrix of token counts using an apriori dictionary of words or tokens. However, in cases where the number words or tokens is large, the computer RAM memory used to store the dictionary can be a limiting factor. In this case, the HashingVectorizer can be used.

In one embodiment, the number transformer 405 is a custom pipeline that selects a column (e.g., using the ItemSelector transformer) and feeds it through a StandardScaler transformer. In one embodiment, the StandardScaler standardizes the numeric variables by centering and/or scaling the values of the data fields using relevant statistics (e.g., mean, standard deviation, etc.). For example, the numeric data fields can be standardized by removing mean and scaling to unit variance, so that the resulting data sets approximates standard normally distributed data.

In one embodiment, the Boolean transformer 407 selects a column (e.g., using the ItemSelector transformer) that contains Boolean data and transforms that column into a numeric representation with 1 equal to a true condition for a given variable and 0 equal to a false condition.

In one embodiment, the tree transformer 409 is a custom pipeline that selects a column (e.g., using the ItemSelector transformer) and feeds it through a DecisionTree transformer to correlate tree values to an incident likelihood (e.g., a likelihood of incident underlying an alert). As noted above, the correlation of the values using a decision tree enables the predictive machine learning model 123 to learn a non-linear relationship between the variable of interest (e.g., time of day) and the incident. For example, the number of actionable alerts or incidents can depend on the time of day, but not necessarily in a linear manner. For example, a video streaming service may have a high number of users during evening hours (e.g., between 7 PM and 11 PM) but not at other times of the day. This may result in a higher likelihood of potential incidents only during evening hours because of the increased load, thereby representing a non-linear relationship between time and incidents. In one embodiment, the DecisionTree is a set of decision rules describing the non-linear relationship. The decision rules typically are expressed as if-then-else decision rules (e.g., if time of day is between 7 PM and 11 PM, likelihood of an incident increases by 50%).

In one embodiment, the data transformation module 203 can concatenate the matrices returned from the transformers 401-409 discussed above into a sparse matrix for training (e.g., via horizontal concatenation of the numerical columns) using, for instance, the FeatureUnion transformer at process 411 of FIG. 4. In embodiment, the concatenation is performed because the sklearn transformers generally operate on a single matrix.

In one embodiment, following data transformation and feature union, the data transformation module 203 then performs a VarianceThreshold transform of the resulting matrix to remove features that have variances below a predetermined threshold value (at process 413). In other words, features (e.g., data fields of the alert data) that have a training-set variance lower than a specified threshold are removed from the numeric matrix. In one embodiment, a default configuration is to remove only features that have the same values in all alerts (e.g., that have zero variance).

In one embodiment, the model training module 205 of FIG. 2 then initiates a tuning of hyperparameters for the predictive machine learning model 123 before training of the model 123 is performed. By way of example, a hyperparameter is a parameter of the predictive machine learning model 123 that affects how machine learning algorithm itself (e.g., parameters related to avoiding overfitting of data by the model). Generally, hyperparameters cannot be learned directly from the training data in the standard model training process and need to be predefined. Examples of hyperparameters are regularization parameters such as a "C" parameter that determines the margin of separation for a classification hyperplane. For example, the "C" or regularization parameter can be varied to avoid misclassifying each training sample or alert. Other examples of hyperparameters include, but are not limited to: a training window duration, a number of leaves or depth of a tree, a learning rate, etc.

In one embodiment, the model training module 205 uses the regularization or "C" parameter as the hyperparameter. The model training module 205 then can use a grid search on the predictive machine learning model 123 with different regularization strength "C" values to optimize the parameter. In one embodiment, the training module 205 can also use training window length as a hyperparameter and also evaluate the optimal training length using the grid search. To optimize each hyperparameter, the model training module 205 calculates a predictive accuracy score for each regularization strength and/or training window length tested on the model 123. In one embodiment, the tuning process uses train-test splitting of the training data to compute the accuracy score. For example, a custom training strategy that trains the model 123 on past alerts and then tests it on subsequent alerts. For example, if there are 1,000 alerts indexed from 0 with one alert occurring per second, and a training length of 20 seconds and attesting of 5 seconds is desired, an example train-test split would look as provided in Table 1 below.

TABLE 1

| Train | Test |
|---|---|
| 0-19 | 20-24 |
| 25-44 | 45-49 |
| 60-69 | 70-74 |
| ... | ... |
| 975-994 | 995-999 |

Figure 5A:
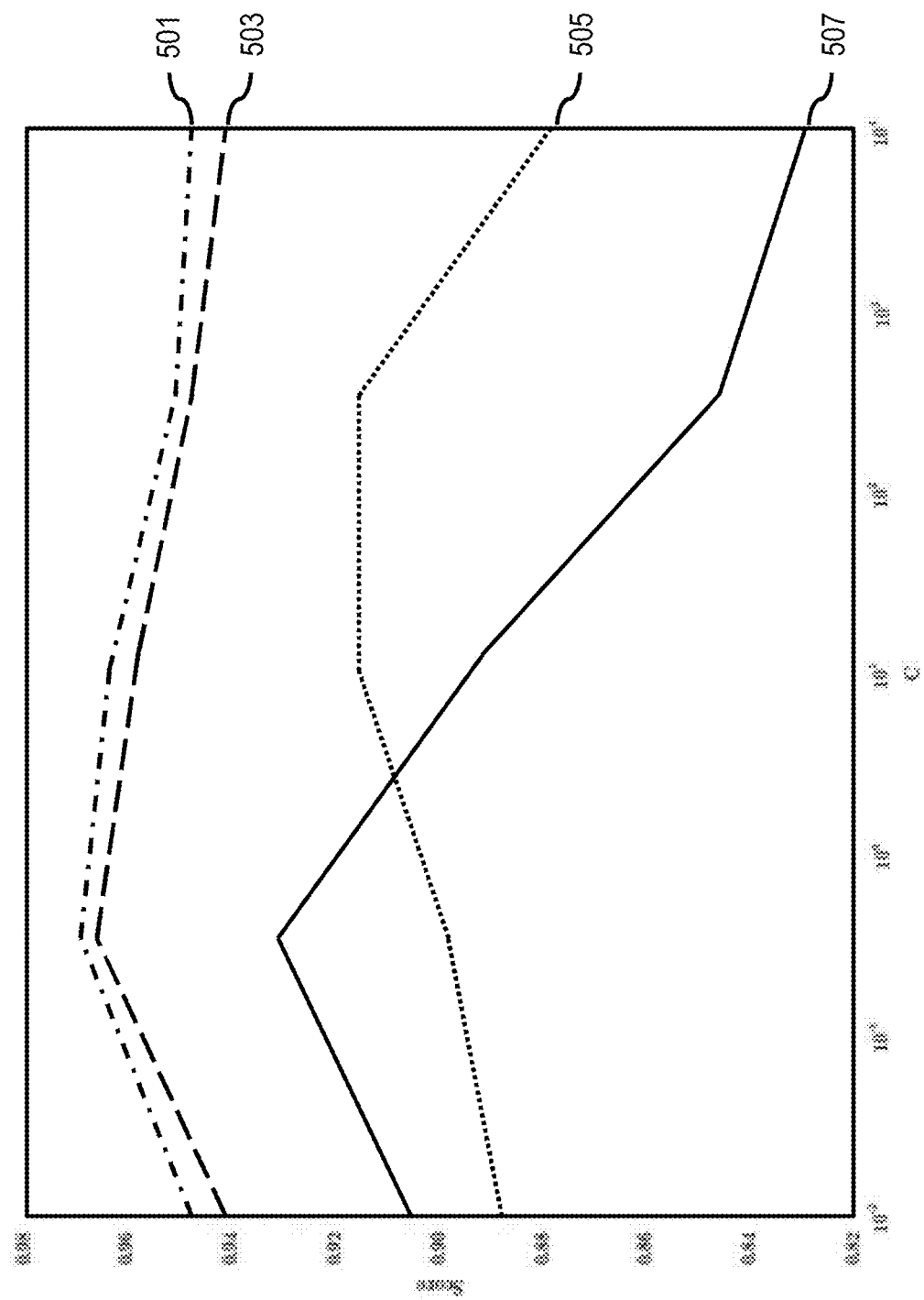
FIGS. 5A and 5B are charts illustrating a process for optimizing the alert classifier, according to one embodiment.

FIG. 5A illustrates a graph resulting from a grid search that varies both "C" value and training length. The graph of FIG. 5 is depicted with the accuracy score represented on the Y axis and the "C" or regularization value on the X-axis.

Each separate graph line 501-507 represents different training window lengths (e.g., graph line 501 representing a training length of 21 days, graph line 503 representing 7 days, graph line 505 representing 2 days, and graph line 507 representing 0 days). In this example, the maximum accuracy is achieved using a "C" value between $10^{-1}$ and $10^0$ for 3 of four training window lengths. This "C" value can be stored as an optimized hyperparameter for the model 123. In addition, the accuracy scores resulting from training for 7 days (e.g., graph line 503) and training for 21 days (e.g., graph line 501) are very similar (e.g., within a threshold window of accuracy), thereby indicating that training lengths beyond 7 days do not result in significant increases in model accuracy. Accordingly, in this example, a training length of 7 days can be set.

In one embodiment, the model training module 205 can also use additional optimizations such as receiver operating characteristic (ROC) area under the curve (AUC) analysis to optimize true positive rates (TPR) and/or false positive rates (FPR) for the model 123. By way of example, a ROC curve is depicts the relationship between TPR and FPR achieved by the model 123 as its discrimination threshold is varied. In one embodiment, TPR is calculated as TPR=(correctly classified actionable alerts or incidents)/(total actionable alerts or incidents), and FPR is calculated as FPR=(incorrectly classified non-actionable alerts or non-incidents)/(total non-actionable alerts or non-incidents). In one embodiment, TPR represents a sensitivity level of the model 123 to detection of an actionable alert; and FPR represents a specificity level of the model 122 with respect to distinguishing between actionable and non-actionable alerts.

Figure 5B:
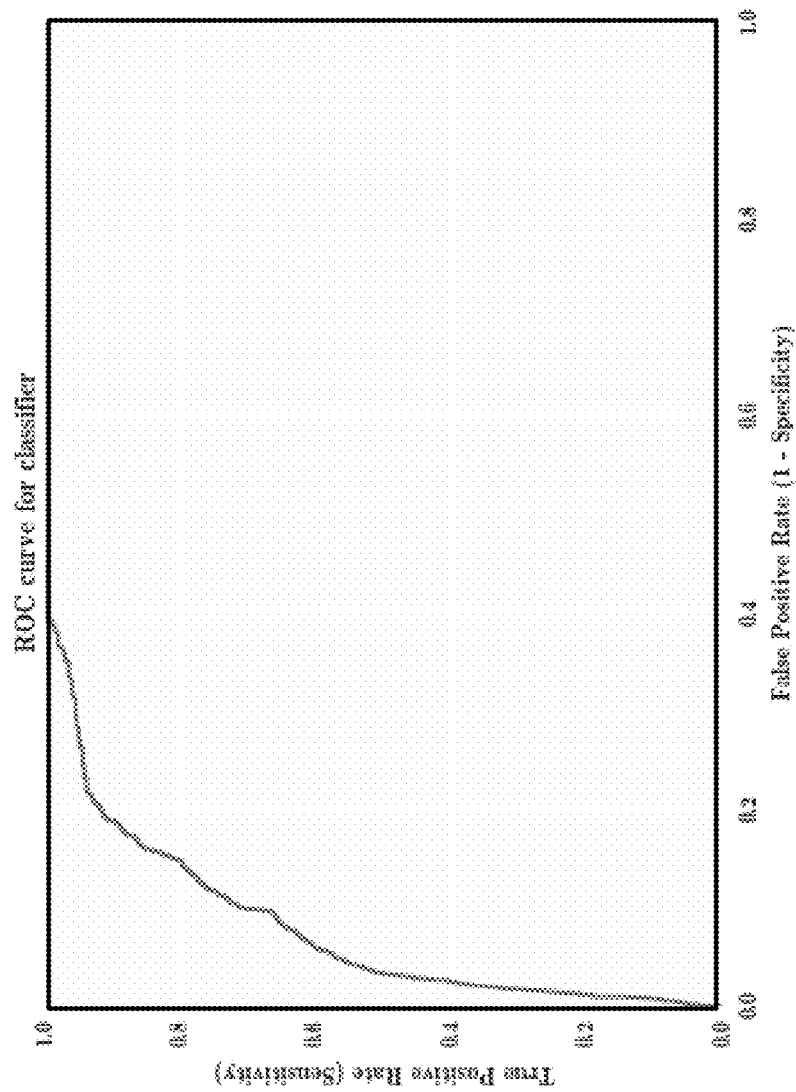

FIG. 5B illustrates an example of a ROC curve for the predictive machine learning model 123 with TPR represented on the Y-axis and FPR represented on the X-axis. In one embodiment, the ROC AUC can be calculated to represent a probability that the model 123 will assign a higher classification score or probability to a randomly chosen positive result (e.g., an actionable alert) than to a randomly chose negative example (e.g., a non-actionable alert). In one embodiment, the model training module 203 can use a SelectFPR transformer 415 as shown in FIG. 4 to select which features or data fields of the alert data to drop to control the total amount of false detections or FPR rates. By way of example, the Select FPR transformer 415 applies a FPR test on each feature to select features with p-values below a specified alpha threshold to control the total amount of false detections expected from the machine learning model 123.

Following optimization to determine the appropriate hyperparameters parameters (e.g., "C" or regularization parameter), training lengths, TPR/FPR, etc., the model training module 205 fits the predictive machine learning to the resulting dataframe or numeric matrix using, for instance, a LogisticRegression transformer 417 as shown in FIG. 4 to apply a regression algorithm on the features in the dataframe to estimate the coefficients, intercept, etc. of the resulting regression equation that best fits the training data. By way of example, a logistic regression is a regression model where the dependent variable is categorical. In one embodiment, the dependent variable of the model 123 is a binary categorical dependent variable (e.g., alert is actionable or non-actionable) that is processed by the LogisticRegression transformer 417.

In one embodiment, the trained predictive machine learning model 123 is then pickled (e.g., serialized) and stored for use by the prediction module 207 of alert classifier 119 to classify subsequent alerts. For example, to make a prediction, the prediction module 207 loads the trained model 123, creates a dataframe (e.g., a 1-row dataframe) from the incoming alert, and then feeds the dataframe to the predict function of the model 123 to obtain a classification and/or calculated probability indicating whether the alert is actionable or non-actionable.

In one embodiment, the alert presentation module 209 can initiate a presentation of newly classified results in a network monitoring user interface. For example, the alert presentation module 209 can append the predicted probability or classification of the alert record as a new data field and transmit this enriched alert to the network monitoring aggregator 115 for presentation. In addition or alternatively, the alert presentation module 209 can present the classification results directly.

Figure 6:
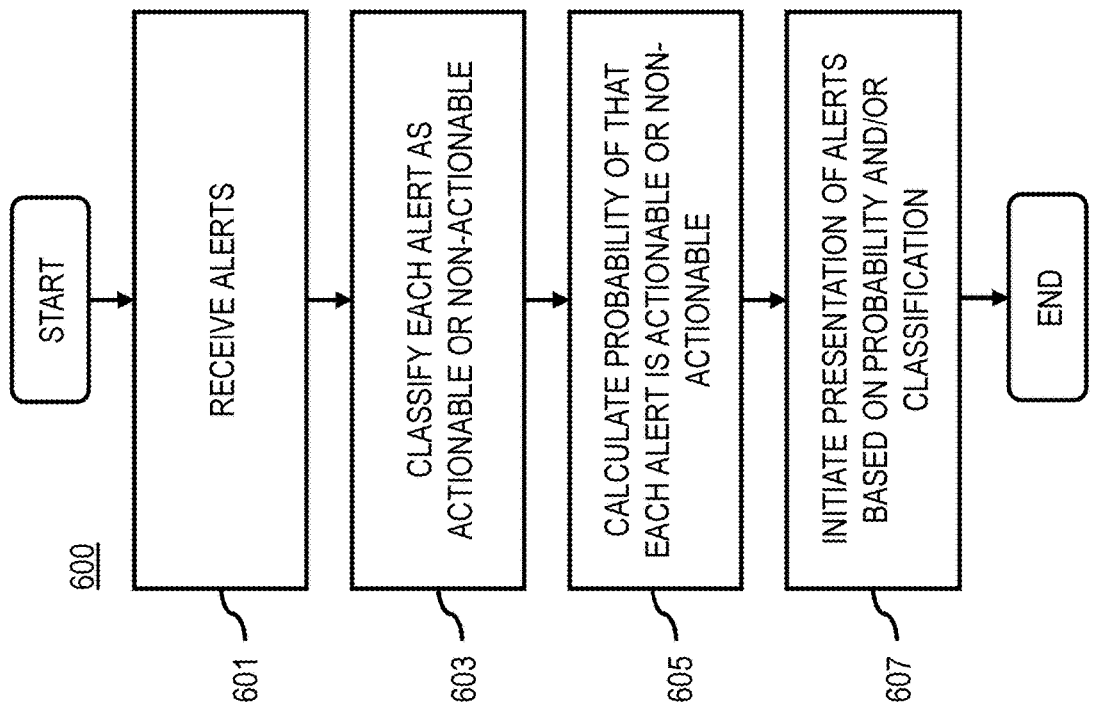
FIG. 6 is a flowchart of a process for classifying alerts as actionable or non-actionable using predictive classification, according to one embodiment.

FIG. 6 is a flowchart of a process for classifying alerts as actionable or non-actionable using predictive classification, according to one embodiment. In various embodiments, the alert classifier 119 may perform one or more portions of the process 600 and may be implemented in, for instance, a chip set including a processor and a memory as shown in FIG. 10. As such, the alert classifier 119 can provide means for accomplishing various parts of the process 600, as well as means for accomplishing embodiments of other processes described herein in conjunction with other components of the system 100. In addition or alternatively, the event broker 111 and/or the network monitoring aggregator 115 may perform any combination of the steps of the process 600 in combination with the alert classifier 119 or as a standalone component. Although the process 600 is illustrated and described as a sequence of steps, its contemplated that various embodiments of the process 600 may be performed in any order or combination and need not include all of the illustrated steps.

In step 601, the alert classifier 119 receives a plurality of alerts (e.g., from the event broker 111 and/or the alarm sources 105 monitoring the services 101). In one embodiment, each alert of the plurality of alerts indicates an alarm condition occurring at a monitored network system. For example, the monitoring tools and/or systems of the alarm sources 105 can be configured to monitor conditions and/or requirements for complying with any operative SLAs. One example of a monitoring tool or alarm source 105 is a Nagios-based monitoring system. The Nagios system is configured to monitor and check each machine (e.g., servers, routers, etc.) associate with a monitored service 101. For each monitored service 101, application, system, network, etc., the monitoring tool or alarm source 105 can have a dedicated webpage (e.g., a Run Book, Wiki, etc.) that contains useful information regarding detailed description of the checks being performed, verifications of system performance, troubleshooting, and steps to be performed in case a check results in an actionable alert (e.g., in Nagios terms, a "Red" status). Other similar alarm sources 105 (e.g., Catchpoint) provide similar or otherwise comparable monitoring features that can generate alert data for classification according to the various embodiments described herein. In one embodiment, each alert is a data record comprising one or more data fields describing the alarm condition or alert.

In step 603, the alert classifier 119 classifies each alert using a predictive machine learning classifier. In one embodiment, the predictive machine learning classifier is trained to classify each alert as actionable or non-actionable using the one or more data fields of each alert as one or more respective classification features, and to calculate a respective probability that said each alert is actionable or non-actionable (step 605). In one embodiment, the alert classifier 119 appends each alert record with an additional data field storing the respective probability. In one embodiment, the predictive classification occurs in real-time or substantially real-time (e.g., with a threshold period of receiving an alert). In one embodiment, the alert classifier 119 converts each alert to be classified into a dataframe and feeds the dataframe into a predict function of the predictive machine learning model. The output of the function includes, for instance, the calculated probability that the alert is actionable or non-actionable.

In step 607, the alert classifier 119 initiates a presentation of the plurality of alerts in a network monitoring user interface based on the respective probability of each alert being actionable or non-actionable. In one embodiment, the alert classifier 119 transmits each appended alert to a network monitoring service. In one embodiment, the network monitoring user interface is presented by the network monitoring service.

In one embodiment, the alert classifier 119 receives a feedback input that specifies a labeled classification for at least one of the plurality of alerts. For example, this feedback input may be provided by operations personnel directly (e.g., as corrective input to override the classification from the alert classifier 119). In other embodiments, the feedback can be inferred if an incident ticket is created or not created for a classified alert. For example, if an alert with a low calculated probability of being actionable is issued an incident ticket by operations personnel, the alert classifier 119 record the incident ticket as a feedback input indicating an erroneously classified alert. The alert classifier 119 then updates a training of the predictive machine learning model based on the feedback input.

In one embodiment, the alert classifier 119 initiate a retraining of the predictive machine learning model based on a change in the monitored network system, an addition of a new monitored network system, or a combination thereof. Because system changes and/or network topology changes can occur frequently, the alert classifier 119 can be automatically configured to retrain periodically (e.g., daily, every two weeks, etc.). In one embodiment, the retraining period can set based on how dynamic the overall topology is and how frequently there are changes impacting alerts (e.g., addition/removal of services, system components, network architecture, etc.). The retraining period can also be optimized using the grid search process described with respect to optimizing hyperparameters and/or training lengths. In one embodiment, the hyperparameters can also be periodically retuned. In some cases, because the retuning process can be resource intensive, the hyperparameters can be retuned less frequently than the model is retrained.

Figure 7:
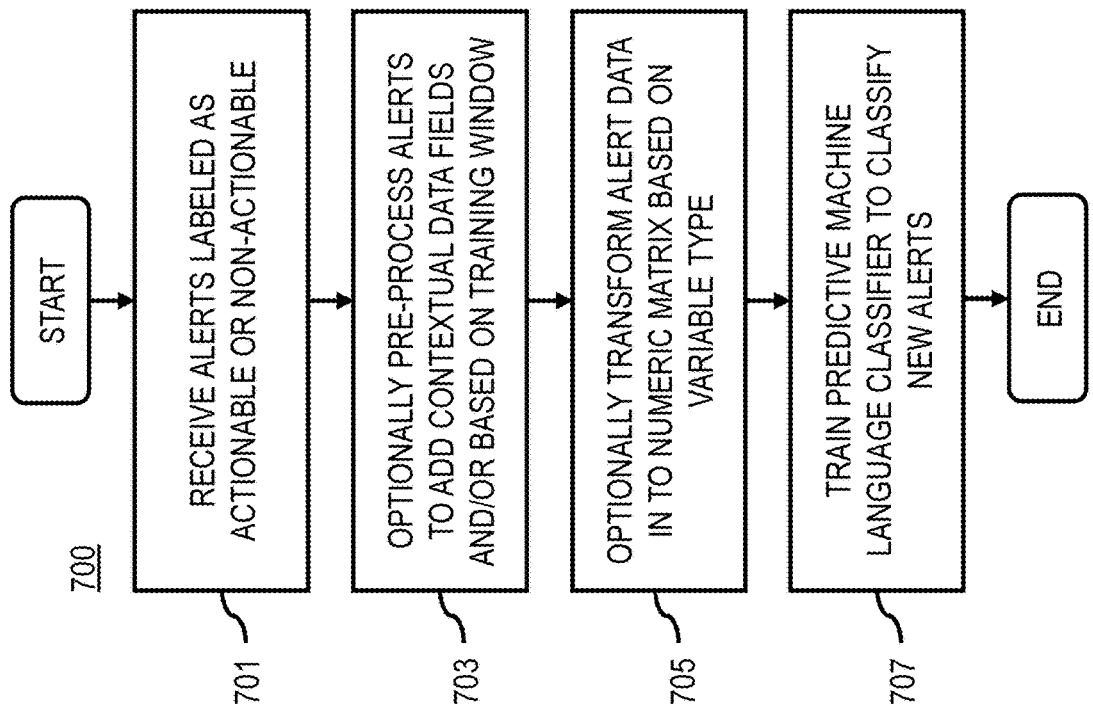
FIG. 7 is a flowchart of a process for training an alert classifier to classify alerts as actionable or non-actionable, according to one embodiment.

FIG. 7 is a flowchart of a process for training an alert classifier to classify alerts as actionable or non-actionable, according to one embodiment. In various embodiments, the alert classifier 119 may perform one or more portions of the process 700 and may be implemented in, for instance, a chip set including a processor and a memory as shown in FIG. 10. As such, the alert classifier 119 can provide means for accomplishing various parts of the process 700, as well as means for accomplishing embodiments of other processes described herein in conjunction with other components of the system 100. In addition or alternatively, the event broker 111 and/or the network monitoring aggregator 115 may perform any combination of the steps of the process 700 in combination with the alert classifier 119 or as a standalone component. Although the process 700 is illustrated and described as a sequence of steps, its contemplated that various embodiments of the process 700 may be performed in any order or combination and need not include all of the illustrated steps.

In step 701, the alert classifier 119 receives a plurality of alerts. In one embodiment, each alert in the plurality of alerts indicates an alarm condition occurring in a monitored network system, and is labeled as either an actionable alert or a non-actionable alert. By way of example, the labeled alerts can be a set of historical data that has previously been labeled as actionable or non-actionable, for instance, by the network monitoring aggregator 115. In other embodiments, the plurality of alerts can be alerts that are labeled in real-time or substantially real-time (e.g., by operations personnel and/or support engineers (e.g., T3 support team) that take action during an incident). In one embodiment, an alert is considered to be labeled as an actionable alert when the alert is associated with an incident number in the network monitoring aggregator 115.

In step 703, the alert classifier 119 optionally pre-processes each alert to add one or more additional data fields to record contextual information about the alarm condition, the monitored system, or a combination thereof. In one embodiment, the pre-processing also comprises segmenting the plurality of alerts based on a training window and a validation window. The plurality of alerts falling within the training window is used to train the predictive machine learning classifier, and the plurality of alerts falling within the validation window are used to validate the predictive machine learning classifier after training.

In one embodiment, the alert classifier 119 selects which of the one or more data fields to designate as the one or more respective classification features based on a variance threshold value. For example, features or data fields whose values do not vary from alert to alert of whose variance is below a predetermined threshold can be removed from the training data. In one embodiment, data fields that are calculated or determined to result in false positive rates above a threshold value can also be removed as a classification feature (e.g., using the SelectFPR transform or similar process described above).

In step 705, the alert classifier 119 optionally transforms the one or more data fields of the set of historical alerts into the numeric matrix based on a variable type of the one or more data fields. As noted above, the variable types include, but are not limited to, categorical variables, text variables, numerical variables, Boolean variables, tree variables or a combination thereof. The type of transformation to apply can be customized for each variable type. For example, the alert classifier binarizes the one or more data fields into a categorical vector based on one or more categorical labels when the variable type is a categorical variable type.

In one embodiment, when the variable type is a text variable type, the alert classifier 119 extracting one or more keywords or tokens from the one or more data fields. The alert classifier 119 then generates a hashed vector of the one or more keywords. In one embodiment, the hashed vector also includes a frequency count of the one or more keywords.

In one embodiment, when the variable type is a decision tree variable type, the alert classifier 119 transforms the one or more data fields using a decision tree to correlate the one or more data fields to a likelihood of being associated with an actionable alert. In one embodiment, the decision tree includes one or more decision rules indicating a non-linear relationship between the one or more data fields and the likelihood of being associated with the actionable alert. Examples of other types of variable transformations are discussed above.

In step 707, the alert classifier 119 trains a predictive machine language model to classify a subsequent alert as actionable or non-actionable using the one or more data fields of said each alert as one or more respective classification features. In one embodiment, the alert classifier 119 trains the predictive machine language model by applying a regression analysis on the one or more respective classification features. In one embodiment, the predictive machine language model is configured to calculate a probability that the subsequent alert is actionable or non-actionable. In one embodiment, the subsequent alert is presented in a network monitoring user interface based on the probability.

FIG. 8 is a diagram illustrating an example user interface for presenting alerts based on predictive classification, according to one embodiment. In the example of FIG. 8, the alert classifier 119 has received and classified a stream of alerts for presentation in the network monitoring user interface (UI) 800. As shown, the UI 800 presents the classified alerts in tabular form with the first column 801 presenting the predicted probability that the respective alert is an actionable alert. The probability ranges from 0 (non-actionable alert) to 1 (actionable alert).

In one embodiment, the UI 800 can also highlight individual entries if the predicted probability that the alert is actionable is greater than a threshold value (e.g., 0.90). An example of this highlighting is illustrated with alert 803. Other alerts (not numbered) that have predicted probabilities greater than the 0.90 threshold value are also highlighted in the UI 800. It is noted that highlighting an actionable is only one example making actionable alerts more visible to operations personnel. It is contemplated that other highlighting methods and techniques can be used (e.g., changing the sort or display order so that alerts with high probabilities of being actionable appear at the top of the screen). In another embodiment, the system 100 can present a UI 800 that displays only those alerts that are above the threshold value or enables operations personnel to selectively sort or filter based on predetermined probability thresholds or thresholds specified by the operational personnel. In yet another embodiment, the alerts with prediction values (e.g., probability that an alert is actionable) above applicable thresholds can be used to automatically trigger creation of an incident tickets. In this case, the system can optionally present a user interface indicating the automatically triggered incident tickets.

The processes described herein for providing predictive classification of actionable alerts may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
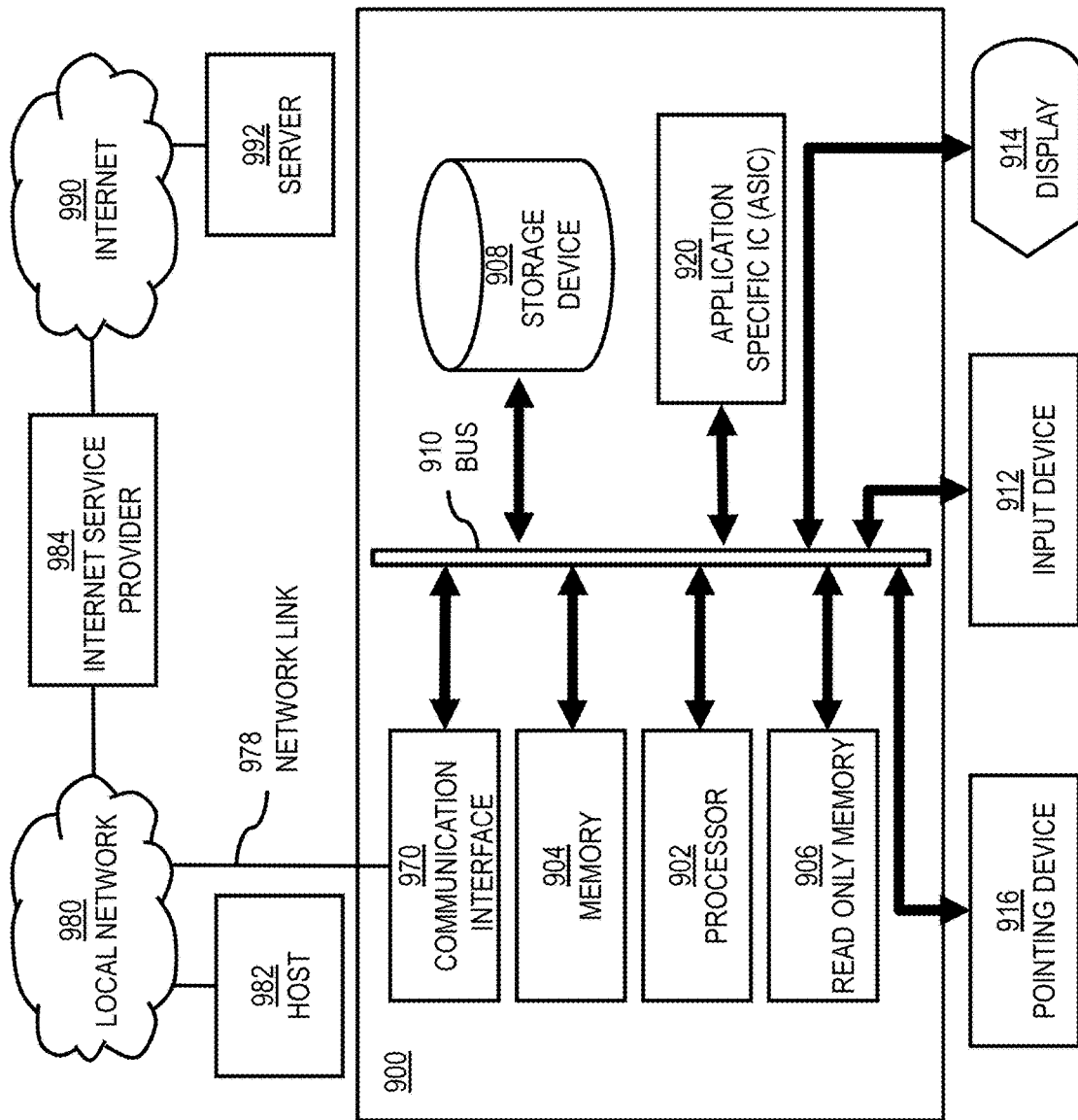
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to provide predictive classification of actionable alerts as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing predictive classification of actionable alerts. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing predictive classification of actionable alerts. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing predictive classification of actionable alerts, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. Network link 978 may provide a connection through local network 980 to a host computer 982 or to equipment operated by an Internet Service Provider (ISP) 984. ISP equipment in turn provides data communication services through Internet 990. A server 992 connected to the Internet 990 that provides a service in response to information received over the Internet. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 109 for providing predictive classification of actionable alerts.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide predictive classification of actionable alerts as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide predictive classification of actionable alerts. The memory 1005 also stores the data associated with or generated by the execution of the inventive steps.

Figure 11:
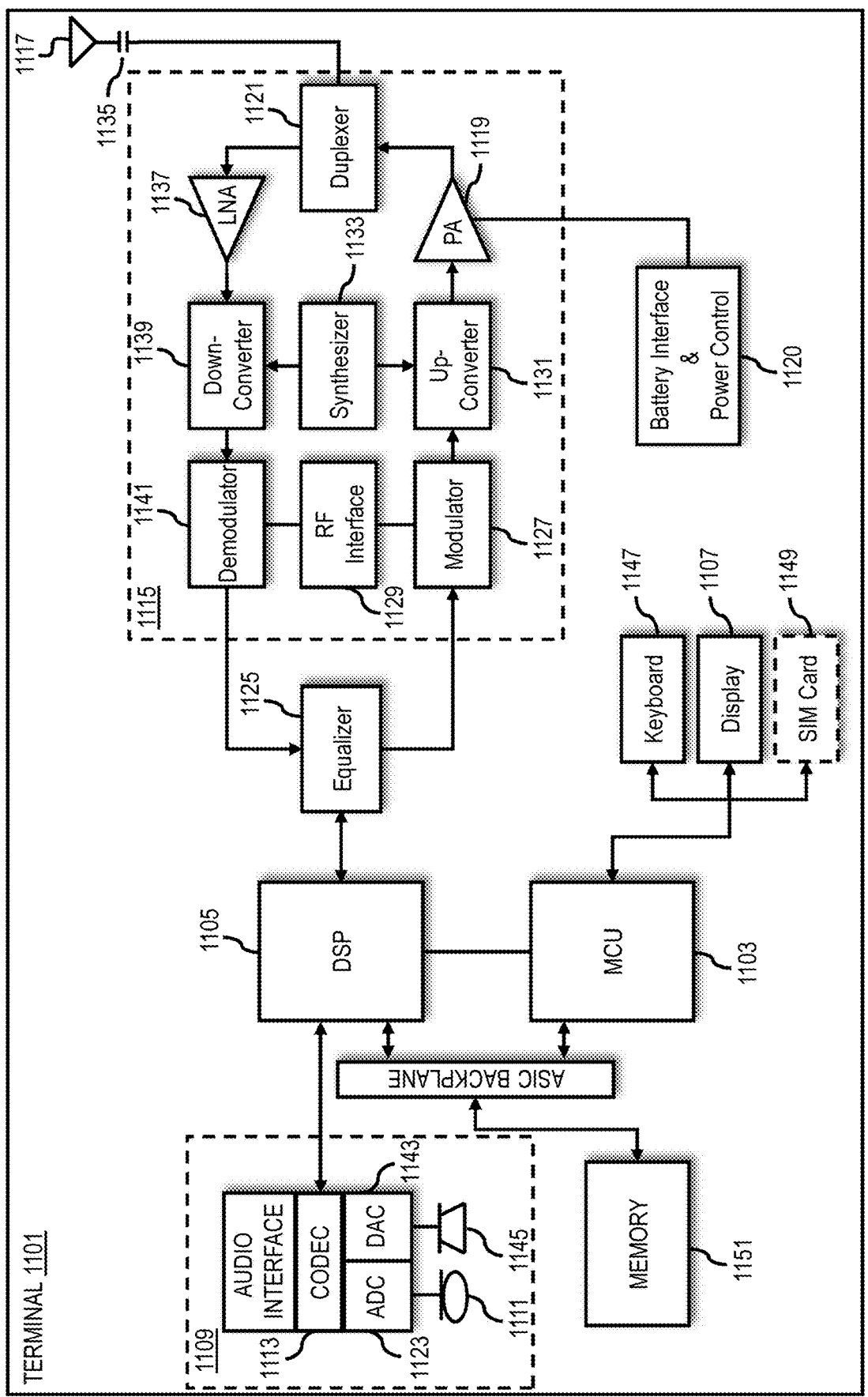
FIG. 11 is a diagram of a terminal that can be used to implement an embodiment of the invention.

FIG. 11 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide predictive classification of actionable alerts. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of presenting a plurality of alerts based on a predictive classification, comprising:
   receiving a plurality of alerts, wherein each alert of the plurality of alerts indicates an alarm condition occurring at a monitored network system, and wherein said each alert is a data record comprising one or more data fields describing the alarm condition;
   classifying said each alert using a predictive machine learning model, wherein the predictive machine learning model is trained to classify said each alert as actionable or non-actionable using the one or more data fields of said each alert as one or more respective classification features, and to calculate a respective probability that said each alert is either actionable or non-actionable by operational personnel of the network system based in part on compliance with pre-established service performance requirements, wherein the predictive machine learning model is modified via a feedback loop incorporated between the predictive machine learning model and manual actionability classifications by the operational personnel; and
   initiating a presentation of the plurality of alerts in a network monitoring user interface based on the respective probability of said each alert,
   wherein the pre-established service performance requirements comprise at least a minimum service uptime, a maximum response time, a maximum resolution time, or a combination thereof.

2. The method of claim 1, further comprising:
   appending said each alert with an additional data field storing the respective probability,
   wherein at least one of the manual actionability classifications is provided by the operational personnel by overriding a classification output of the predictive machine learning model, issuing or skipping an incident ticket contradicting the classification output, or a combination thereof.

3. The method of claim 2, further comprising:
   transmitting said each appended alert to a network monitoring service,
   wherein the network monitoring user interface is presented by the network monitoring service, and
   wherein the presentation highlights some of the alerts together with the respective probability reaching a threshold value between 0 and 1.

4. The method of claim 1, further comprising:
   receiving a set of historical alerts that are labeled as actionable or non-actionable,
   wherein the predictive machine learning model is trained using the set of historical alerts, and
   wherein a non-actionable alert can be automatically resolved without intervention from the operational personnel.

5. The method of claim 4, further comprising:
   transforming the one or more data fields of the set of historical alerts into a numeric matrix based on a variable type of the one or more data fields,
   wherein the predictive machine learning model is trained using the numeric matrix, and
   wherein the non-actionable alert can be automatically resolved via automatic scaling of one or more available servers.

6. The method of claim 5, further comprising:
   binarizing the one or more data fields into a categorical vector based on one or more categorical labels when the variable type is a categorical variable type,
   wherein the categorical vector is included in the numeric matrix for training of the predictive machine learning model.

7. The method of claim 5, further comprising:
   extracting one or more keywords from the one or more data fields when the variable type is a text variable type; and
   generating a hashed vector of the one or more keywords,
   wherein the hashed vector is included in the numeric matrix for training of the predictive machine learning model.

8. The method of claim 5, wherein the variable type is a decision tree variable type, the method further comprising:
   transforming the one or more data fields using a decision tree to correlate the one or more data fields to a likelihood of being associated with an actionable alert,
   wherein the decision tree includes one or more decision rules indicating a non-linear relationship between the one or more data fields and the likelihood of being associated with the actionable alert.

9. The method of claim 5, wherein the variable type is a temporal variable type including a time-of-day variable.

10. The method of claim 1, further comprising:
    receiving a feedback input that specifies a labeled classification for at least one of the plurality of alerts; and
    updating a training of the predictive machine learning model based on the feedback input,
    wherein the presentation displays only some of the alerts together with the respective probability reaching a threshold value between 0 and 1.

11. A non-transitory computer-readable storage medium to present a plurality of alerts based on a predictive classification, carrying one or more sequences of one or more instructions which, when executed by one or more processors, cause an apparatus to perform:
    receiving a plurality of alerts, wherein each alert in the plurality of alerts indicates an alarm condition occurring in a monitored network system, and wherein said each alert is labeled as either actionable or non-actionable by operational personnel of the network system based in part on compliance with pre-established service performance requirements, wherein the predictive machine learning model is modified via a feedback loop incorporated between the predictive machine learning model and manual actionability classifications by the operational personnel; and
    training a predictive machine learning model to classify a subsequent alert as actionable or non-actionable using the one or more data fields of said each alert as one or more respective classification features, wherein the predictive machine learning model is configured to calculate a probability that the subsequent alert is actionable or non-actionable;

wherein the subsequent alert is presented in a network monitoring user interface based on the probability, and wherein the pre-established service performance requirements comprise at least a minimum service uptime, a maximum response time, a maximum resolution time, or a combination thereof.

12. The non-transitory computer-readable storage medium of claim 11, wherein the apparatus is further caused to perform:

pre-processing said each alert to add one or more additional data fields to record contextual information about the alarm condition, the monitored system, or a combination thereof, wherein the predictive machine learning model is further trained using the one or more additional data fields.

13. The non-transitory computer-readable storage medium of claim 11, wherein the apparatus is further caused to perform:

segmenting the plurality of alerts based on a training window and a validation window, wherein the plurality of alerts falling within the training window is used to train the predictive machine learning model; and wherein the plurality of alerts falling within the validation window are used to validate the predictive machine learning model after training.

14. The non-transitory computer-readable storage medium of claim 11, wherein the apparatus is further caused to perform:

determining that said each alert is labeled as an actionable alert when said each alert is associated with an incident number.

15. The non-transitory computer-readable storage medium of claim 11, wherein the apparatus is further caused to perform:

training the predictive machine learning model by applying a regression analysis on the one or more respective classification features.

16. The non-transitory computer-readable storage medium of claim 11, wherein the apparatus is further caused to perform:

selecting the one or more data fields to designate as the one or more respective classification features based on a variance threshold value.

17. The non-transitory computer-readable storage medium of claim 11, wherein the apparatus is further caused to perform:

initiating a retraining of the predictive machine learning model based on a change in the monitored network system, an addition of a new monitored network system, or a combination thereof.

18. An apparatus to present a plurality of network alerts based on a predictive classification, comprising:

at least one processor; and at least one memory including computer program code for one or more programs, the at least one memory and the computer program code configured to, with the at least one processor, cause the apparatus to perform at least the following:

receive a plurality of alerts, wherein each alert of the plurality of alerts indicates an alarm condition occurring in a monitored network system, and wherein said each alert is a data record comprising one or more data fields describing the alarm condition;

designate the one or more data fields as one or more classification features of a predictive machine learning model configured to classify said each alert as either actionable or non-actionable by operational personnel of the network system based in part on compliance with pre-established service performance requirements, wherein the predictive machine learning model is modified via a feedback loop incorporated between the predictive machine learning model and manual actionability classifications by the operational personnel;

calculate a respective probability that said each alert is actionable or non-actionable using the predictive machine learning model; and present the plurality of alerts in a network monitoring user interface based on the calculated respective probability of said each alert, wherein the pre-established service performance requirements comprise at least a minimum service uptime, a maximum response time, a maximum resolution time, or a combination thereof.

19. The apparatus of claim 18, wherein the apparatus is further caused to:

append said each alert with an additional data field storing the respective probability.

20. The apparatus of claim 18, wherein the apparatus is further caused to:

determining whether to present said each alert in the network monitoring user interface, a sort order for presenting said each alert, or a combination thereof based on the respective probability.

* * * * *